United States Patent
Kim et al.

(10) Patent No.: US 9,014,094 B2
(45) Date of Patent: Apr. 21, 2015

(54) MAIN HUB, SUB HUB, AND SENSOR NODE COMMUNICATING IN WIRELESS BODY AREA NETWORK (WBAN) INCLUDING AT LEAST ONE SUB HUB, AND COMMUNICATION METHOD THEREOF

(71) Applicants: Young Soo Kim, Seoul (KR); Chang Soon Park, Chungju-si (KR); Tae In Hyon, Hwaseong-si (KR); Hyo Sun Hwang, Seoul (KR); Sung Soo Park, Seoul (KR); Seok Won Lee, Seoul (KR); Hyung Sik Ju, Yongin-si (KR); Dae Sik Hong, Seoul (KR)

(72) Inventors: Young Soo Kim, Seoul (KR); Chang Soon Park, Chungju-si (KR); Tae In Hyon, Hwaseong-si (KR); Hyo Sun Hwang, Seoul (KR); Sung Soo Park, Seoul (KR); Seok Won Lee, Seoul (KR); Hyung Sik Ju, Yongin-si (KR); Dae Sik Hong, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 168 days.

(21) Appl. No.: 13/676,892

(22) Filed: Nov. 14, 2012

(65) Prior Publication Data

US 2013/0195083 A1   Aug. 1, 2013

(30) Foreign Application Priority Data

Jan. 26, 2012 (KR) .................. 10-2012-0007885

(51) Int. Cl.
*H04W 72/04* (2009.01)
*H04W 56/00* (2009.01)
*H04L 5/00* (2006.01)
*H04W 84/10* (2009.01)
*H04W 48/12* (2009.01)

(52) U.S. Cl.
CPC ........ *H04W 72/0446* (2013.01); *H04W 56/001* (2013.01); *H04L 5/0048* (2013.01); *H04L 5/0035* (2013.01); *H04W 84/10* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 2005/0180385 A1 | 8/2005 | Jeong et al. | |
| 2007/0025244 A1* | 2/2007 | Ayyagari et al. | 370/229 |
| 2009/0088605 A1* | 4/2009 | Ross et al. | 600/300 |
| 2010/0157914 A1* | 6/2010 | Kim et al. | 370/329 |
| 2010/0195552 A1* | 8/2010 | Ho | 370/311 |
| 2010/0285807 A1 | 11/2010 | Miller-Smith | |
| 2011/0196451 A1* | 8/2011 | Hill | 607/60 |
| 2011/0286424 A1* | 11/2011 | Jeon et al. | 370/329 |
| 2012/0069869 A1* | 3/2012 | Jeong et al. | 375/132 |

(Continued)

FOREIGN PATENT DOCUMENTS

| | | | |
|---|---|---|---|
| KR | 10-2005-0055118 A | 6/2005 | |
| KR | 10-2005-0102702 A | 10/2005 | |

(Continued)

*Primary Examiner* — Kerri Rose
(74) *Attorney, Agent, or Firm* — NSIP Law

(57) ABSTRACT

A main hub, a sub hub, and a sensor node communicating in a wireless body area network (WBAN) including at least one sub hub, and a communication method thereof, are provided. A communication method of the main hub, includes assigning a beacon slot to the sub hub. The method further includes receiving, from the sub hub, a beacon signal based on the beacon slot. The method further includes verifying whether the sub hub includes data to be transmitted to the main hub based on the beacon signal. The method further includes receiving, from the sub hub, the data based on a result of the verification.

28 Claims, 12 Drawing Sheets

(56) References Cited

U.S. PATENT DOCUMENTS

2013/0172042 A1* 7/2013 Kim et al. .................. 455/524
2014/0153468 A1* 6/2014 Ho ............................. 370/311
2014/0192696 A1* 7/2014 Wang et al. ................ 370/311

FOREIGN PATENT DOCUMENTS

| KR | 10-2009-0065307 A | 6/2009 |
| KR | 10-2010-0020925 A | 2/2010 |
| KR | 10-2011-0001843 A | 1/2011 |

* cited by examiner

1200

1300

1400

MAIN HUB, SUB HUB, AND SENSOR NODE COMMUNICATING IN WIRELESS BODY AREA NETWORK (WBAN) INCLUDING AT LEAST ONE SUB HUB, AND COMMUNICATION METHOD THEREOF

CROSS-REFERENCE TO RELATED APPLICATION(S)

This application claims the benefit under 35 U.S.C. §119 (a) of Korean Patent Application No. 10-2012-0007885, filed on Jan. 26, 2012, in the Korean Intellectual Property Office, the entire disclosure of which is incorporated herein by reference for all purposes.

BACKGROUND

1. Field

The following description relates to a main hub, a sub hub, and a sensor node communicating in a wireless body area network (WBAN) including at least one sub hub, and a communication method thereof.

2. Description of Related Art

To minimize power consumption and system complexity, a wireless body area network (WBAN) based on the Institute of Electrical and Electronics Engineers (IEEE) 802.15.6 standard may provide only a star topology in which sensors are connected to a hub. In a WBAN, a hub may operate the WBAN through a medium access control, a power control, and a beacon transmission for time synchronization.

Communication devices equipped with a WBAN communication protocol and an Internet and cellular access function, such as, for example, a mobile phone, may be used as a hub of a WBAN. However, in the daily life of a user, a hub may be absent. Accordingly, a WBAN may not be appropriately controlled whereby a signal may not be received from a sensor node of the WBAN.

For example, a low-power WBAN may constrain a transmission power of a sensor node to increase a lifetime of the sensor node. Accordingly, a communicable transmission and reception distance between a hub and the sensor node may be constrained. If a line of sight (LoS) between the hub and the sensor node is not secured, the communication performance may be further degraded. In addition, with respect to a sensor node, a memory storage capability may be limited in order to decrease power consumption, hardware complexity, and production costs. Accordingly, it may be impossible to store sensor data for a long period of time while the hub is absent.

SUMMARY

In one general aspect, there is provided a communication method of a main hub in a wireless body area network (WBAN) including the main hub, a sub hub, and a sensor node, the method including, assigning a beacon slot to the sub hub. The method further includes receiving, from the sub hub, a beacon signal based on the beacon slot. The method further includes verifying whether the sub hub includes data to be transmitted to the main hub based on the beacon signal. The method further includes receiving, from the sub hub, the data based on a result of the verification.

The method may further include receiving, from the sub hub, a request for connection between the sub hub and the main hub. The method may further include connecting the sub hub and the main hub in response to the request. The method may further include transmitting, to the sensor node, information about the sub hub connected to the main hub.

The method may further include assigning, to the main hub, another beacon slot. The method may further include transmitting, to the sub hub and the sensor node, another beacon signal based on the other beacon slot.

The method may further include assigning, to the sub hub, an uplink period for data transmission based on the result of the verification.

The method may further include assigning, to the main hub, another beacon slot. The method may further include transmitting, to the sub hub, information about the uplink period using another beacon signal based on the other beacon slot.

The method may further include recognizing that the sub hub is absent based on a communicability with the sub hub.

A non-transitory computer-readable storage medium may store a program including instructions to cause a computer to perform the method.

In another general aspect, there is provided a communication method of a sub hub in a wireless body area network (WBAN) including a main hub, the sub hub, and a sensor node, the method including receiving, from the main hub, information about a beacon slot of the main hub. The method further includes receiving, from the sensor node, data. The method further includes determining whether the main hub is absent based on whether the sub hub receives, from the main hub, a beacon signal based on the beacon slot. The method further includes transmitting, to the main hub, the data based on a result of the determination.

The method may further include requesting the main hub for connection between the main hub and the sub hub.

The requesting of the main hub may include setting a sender identifier (ID) of another beacon signal that is transmitted from the sub hub.

The method may further include transmitting, to the sensor node, an acknowledgement (ACK) signal based on the sender ID.

The method may further include setting a time synchronization with another sub hub neighboring the sub hub based on a result of the determination.

The setting of the time synchronization may include setting another beacon slot based on a receivable beacon signal of the other sub hub at predetermined beacon periods. The setting of the time synchronization may further include obtaining time synchronization information based on the other beacon slot. The setting of the time synchronization may further include setting the time synchronization based on the time synchronization information.

The method may further include receiving, from the main hub, information about an uplink period for data transmission based on the result of the determination. The method may further include transmitting, to the main hub, the data based on the information about the uplink period.

The method may further include assigning, to the main hub, a downlink period for data transmission based on the information about the uplink period.

The method may further include transmitting, to the main hub, an ACK signal requesting the main hub for assignment, to the sub hub, of a period based on a node ID of the sensor node.

In still another general aspect, there is provided a communication method of a sensor node in a wireless body area network (WBAN) including a main hub, a sub hub, and the sensor node, the method including receiving, from the main hub, information about the sub hub connected to the main hub, and information about beacon slots of the main hub and the sub hub, respectively. The method further includes receiving, from the main hub, or the sub hub, or any combination thereof, a beacon signal based on the information about the beacon slots. The method further includes determining a target hub, among the main hub and the sub hub, to process data of the sensor node based on the beacon signal. The method further includes transmitting, to the target hub, the data.

The determining of the target hub may include determining the main hub as the target hub if the beacon signal is received from the main hub.

The determining of the target hub may include determining the sub hub as the target hub if the beacon signal is not received from the main hub and is received from the sub hub.

In yet another general aspect, there is provided a main hub in a wireless body area network (WBAN) including the main hub, a sub hub, and a sensor node, the main hub including a slot assignment unit configured to assign, to the sub hub, a beacon slot. The main hub further includes a receiver configured to receive, from the sub hub, a beacon signal based on the beacon slot. The main hub further includes a verifier configured to verify whether the sub hub includes data to be transmitted to the main hub based on the beacon signal. The receiver is further configured to receive, from the sub hub, the data based on a result of the verification.

The receiver may be further configured to receive, from the sub hub, a request for connection between the sub hub and the main hub. The main hub may further include a connection unit configured to connect the sub hub and the main hub in response to the request. The main hub may further include a transmitter configured to transmit, to the sensor node, information about the sub hub connected to the main hub.

The main hub may further include an uplink assignment unit configured to assign, to the sub hub, an uplink period for data transmission based on the result of the verification.

In another general aspect, there is provided a sub hub in a wireless body area network (WBAN) including a main hub, the sub hub, and a sensor node, the sub hub including a receiver configured to receive, from the main hub, information about a beacon slot of the main hub. The receiver is further configured to receive, from the sensor node, data. The sub hub further includes a determining unit configured to determine whether the main hub is absent based on whether the sub hub receives, from the main hub, a beacon signal based on the beacon slot. The sub hub further includes a transmitter configured to transmit, to the main hub, the data based on a result of the determination.

The sub hub may further include a connection request unit configured to request the main hub for connection between the main hub and the sub hub.

The sub hub may include a control function with respect to the WBAN.

In still another general aspect, there is provided a sensor node in a wireless body area network (WBAN) including a main hub, a sub hub, and the sensor node, the sensor node including a receiver configured to receive, from the main hub, information about the sub hub connected to the main hub, and information about beacon slots of the main hub and the sub hub, respectively. The receiver is further configured to receive, from the main hub, or the sub hub, or any combination thereof, a beacon signal based on the information about the beacon slots. The sensor node further includes a determining unit configured to determine a target hub, among the main hub and the sub hub, to process data of the sensor based on the beacon signal. The sensor node further includes a transmitter configured to transmit, to the target hub, the data.

The determining unit may be further configured to determine the main hub as the target hub if the beacon signal is received from the main hub. The determining unit may be further configured to determine the sub hub as the target hub if the beacon signal is not received from the main hub and is received from the sub hub.

Other features and aspects will be apparent from the following detailed description, the drawings, and the claims.

Figure 1:
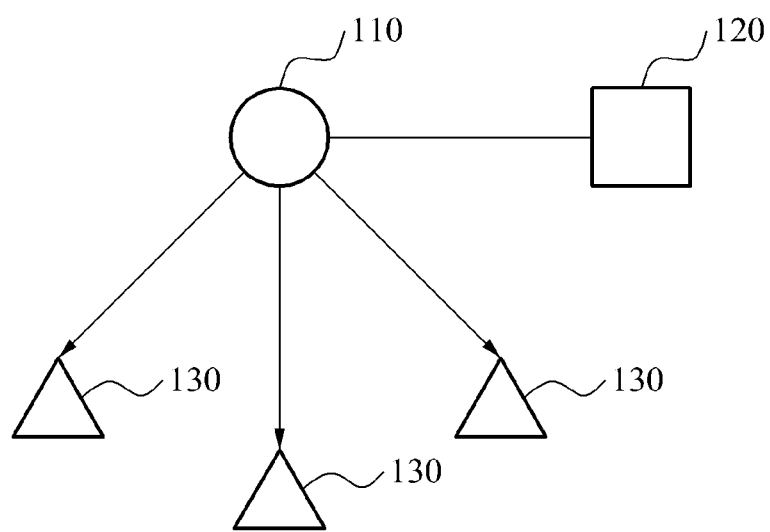
FIG. 1 is a diagram illustrating an example of a topology of a main hub, a sub hub, and sensor nodes that constitute a wireless body area network (WBAN).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a topology of a main hub 110, a sub hub 120, and sensor nodes 130 that constitute a wireless body area network (WBAN), and an example of the main hub 110, the sub hub 120, and the sensor nodes 130 transferring information during an initial connection method. Referring to FIG. 1, the WBAN includes the main hub 110, the sub hub 120, and the sensor nodes 130.

The main hub 110 may include, for example, a mobile communication terminal, a personal digital assistant (PDA), and/or other communication devices known to one of ordinary skill in the art. The main hub 110 includes a function of controlling the WBAN, and includes a WBAN communication protocol. Additionally, the main hub 110 may include a function of accessing the Internet and/or a cellular network.

The sub hub 120 also includes a function of controlling the WBAN. The sub hub 120 performs the initial connection method with the main hub 110 to operate in the WBAN. Accordingly, the main hub 110 informs the sensor nodes 130 about information associated with the connection between the main hub 110 and the sub hub 120, such as, for example, a hub identifier (HID) of the sub hub 120, assigned beacon slot information, and/or other information known to one of ordinary skill in the art. Through the initial connection method, the sub hub 120 is added to the WBAN operating under the control of the main hub 110, and supports the WBAN to be effectively operated.

Each of the sensor nodes 130 measures a biosignal using the WBAN communication protocol. Each of the sensor nodes 130 transfers the biosignal to a hub, such as, for example, the main hub 110 and/or the sub hub 120.

Figure 2:
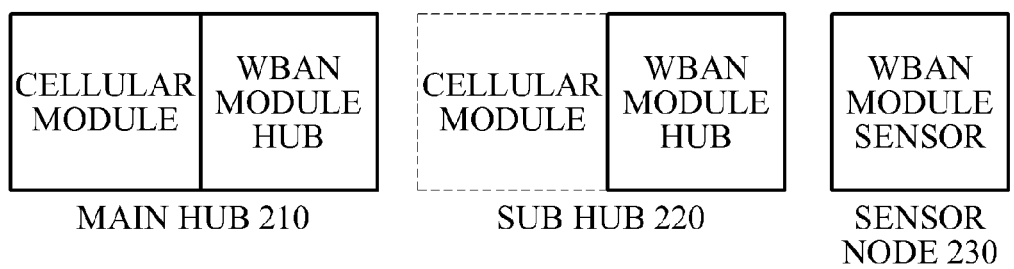
FIG. 2 is a diagram illustrating an example of functions of a main hub, a sub hub, and a sensor node that constitute a WBAN.

FIG. 2 illustrates an example of functions of a main hub 210, a sub hub 220, and a sensor node 230 that constitute a WBAN. Each of the main hub 210 and the sub hub 220 includes a function of controlling the WBAN, e.g., a WBAN module hub. The main hub 210 additionally includes a function of accessing the Internet and/or a cellular network (e.g., a cellular module), and the sub hub 220 may additionally include this function. The sensor node 230 includes a function of measuring a biosignal and transferring the biosignal to a hub, such as, for example, the main hub 210 or the sub hub 220, e.g., a WBAN module sensor.

Figure 3:
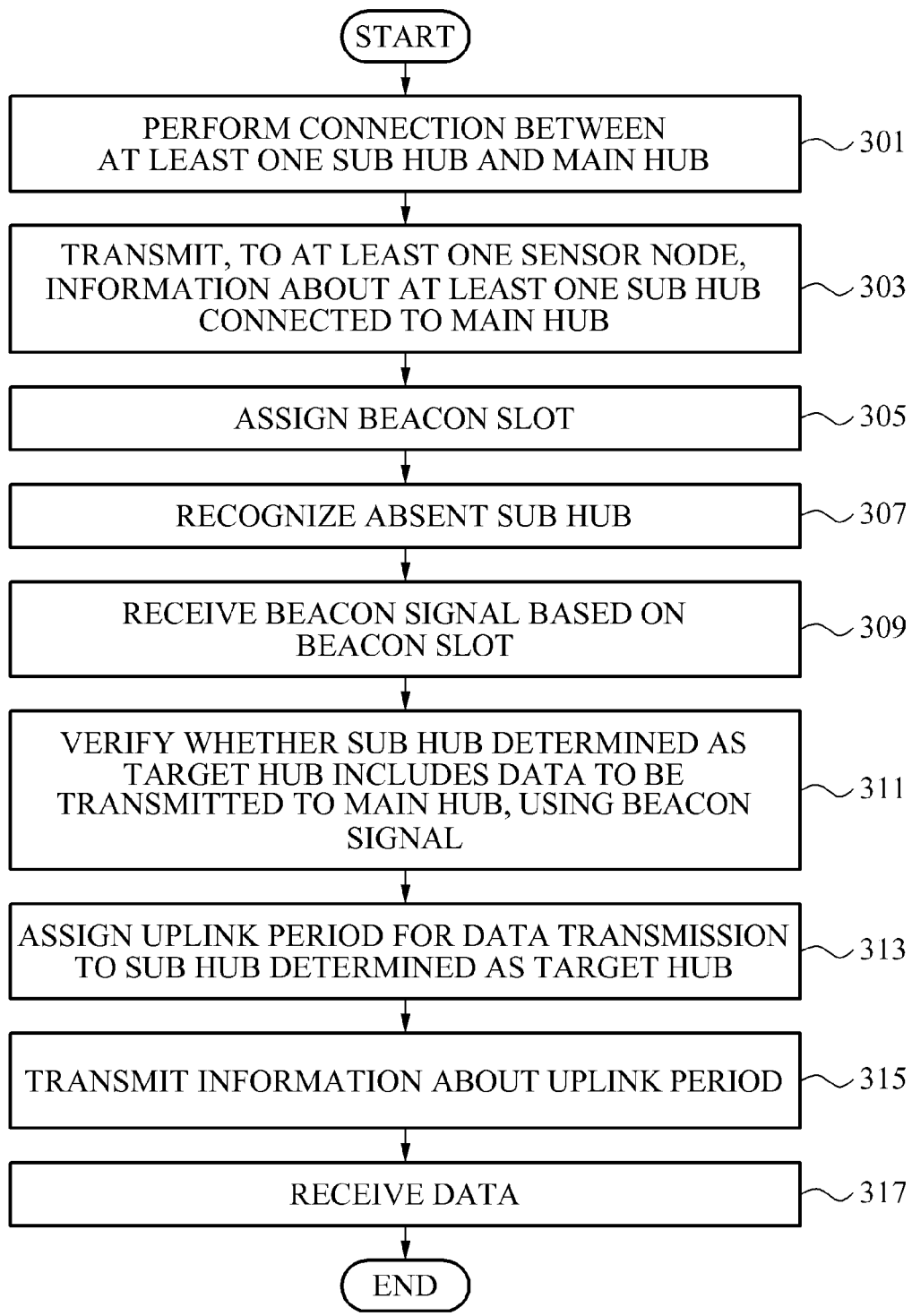
FIG. 3 is a flowchart illustrating an example of a communication method of a main hub in a WBAN.

FIG. 3 illustrates an example of a communication method of a main hub in a WBAN. Hereinafter, the communication method of the main hub in the WBAN including the main hub, at least one sub hub, and at least one sensor node will be described with reference to FIG. 3.

In operation 301, in response to a request of the sub hub, the main hub performs a connection between the sub hub and the main hub. In operation 303, the main hub transmits, to the sensor node, information about the sub hub connected to the main hub. All sensor nodes in the WBAN determines whether beacon signals are received from all hubs based on the information about the sub hub that is transmitted from the main hub, such as, for example, an HID of the sub hub, assigned beacon slot information, and/or other information known to one of ordinary skill in the art.

In operation 305, the main hub assigns a beacon slot to each of the main hub and the sub hub. The main hub transmits a beacon signal of the main hub to the sub hub and the sensor node based on an assigned beacon slot of the main hub.

In operation 307, the main hub recognizes an absent sub hub among sub hubs connected to the main hub based on communicability (or lack thereof) with the sub hubs, in the WBAN. When the main hub recognizes the absent sub hub, the main hub suspends transmission of the beacon signal to the absent sub hub.

In operation 309, the main hub receives, from a sub hub among the sub hubs that is determined as a target hub by the sensor node, a beacon signal based on an assigned beacon slot of the target hub. In operation 311, the main hub verifies whether the target hub includes data to be transmitted to the main hub based on the beacon signal.

In operation 313, the main hub assigns an uplink period for data transmission to the target hub based on a result of the verification. In operation 315, the main hub transmits information about the uplink period to the target hub, using the beacon signal of the main hub. In operation 317, the main hub receives data from the target hub.

Figure 4:
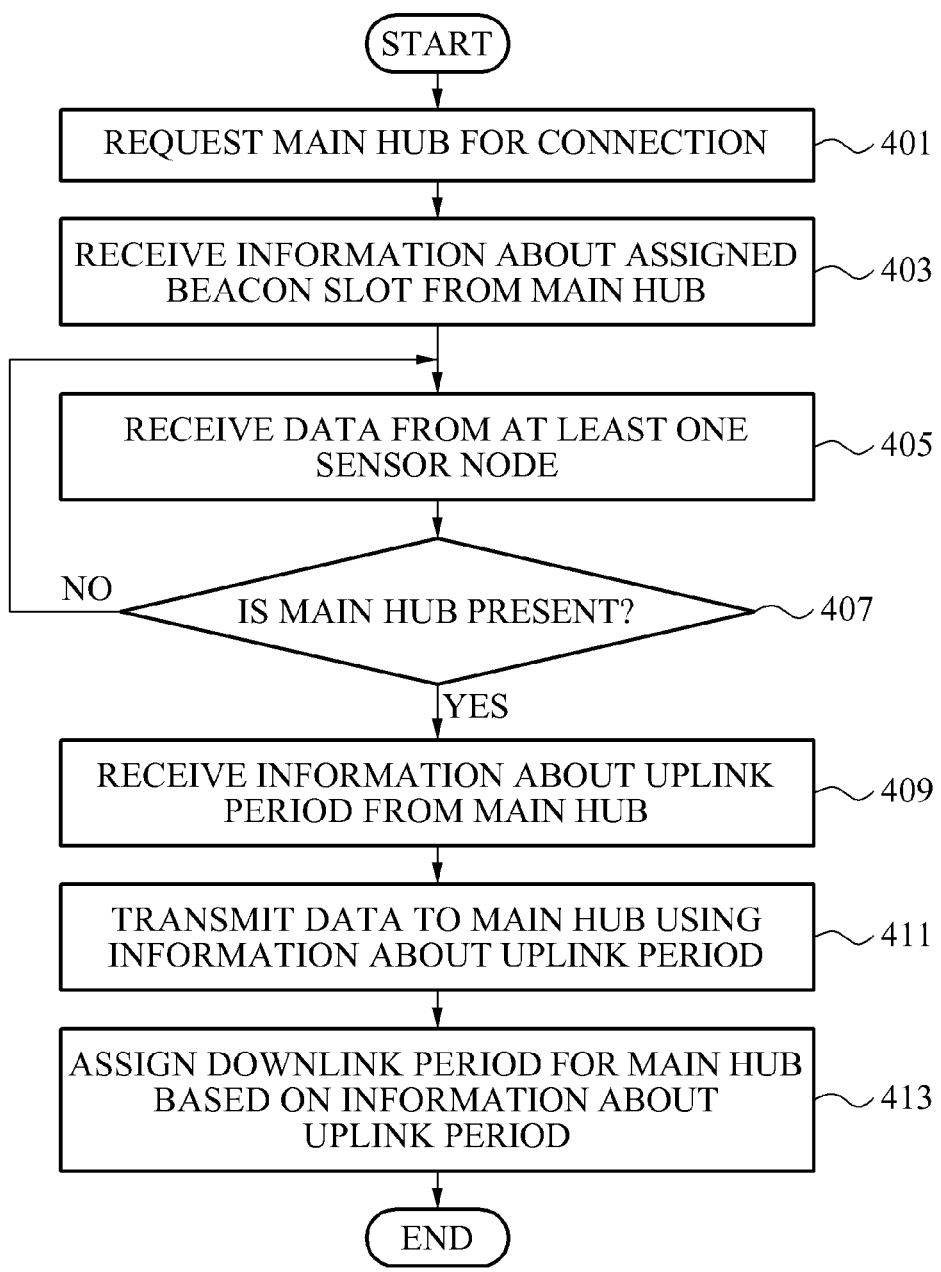
FIG. 4 is a flowchart illustrating an example of a communication method of a sub hub in a WBAN.

FIG. 4 illustrates an example of a communication method of a sub hub in a WBAN. Hereinafter, the communication method of the sub hub in the WBAN including a main hub, at least one sub hub, and at least one sensor node will be described with reference to FIG. 4.

In operation 401, the sub hub requests the main hub for connection between the main hub and the sub hub. In operation 403, the sub hub receives, from the main hub, information about an assigned beacon slot of each of the main hub and the sub hub.

In operation 405, the sub hub receives data from the sensor node. The sub hub stores the data in a memory and/or other storage devices known to one of ordinary skill in the art. The sub hub receiving the data corresponds to a sub hub determined as a target hub by the sensor node.

In operation 407, the sub hub determines whether the main hub is present. The sub hub determines whether the main hub is present based on whether a beacon signal transmitted from the main hub is present, i.e., whether the sub hub receives the beacon signal from the main hub based on the assigned beacon slot of the main hub. That is, the sub hub knows of the beacon signal of the main hub based on the information about the assigned beacon slot received from the main hub.

If the main hub is present, in operation 409, the sub hub receives information about an uplink period from the main hub. On the contrary, if the main hub is absent, the sub hub returns to operation 405 to continuously receive data from the sensor node. Additionally, if the main hub is absent, the sub hub may set a time synchronization with at least one neighboring sub hub to maintain a beacon period of the WBAN.

In operation 411, the sub hub transmits the data to the main hub based on the information about the uplink period received from the main hub. The sub hub may transmit the data to the main hub through an inter-hub communication. In operation 413, the sub hub assigns a downlink period for the main hub based on the information about the uplink period.

Figure 5:
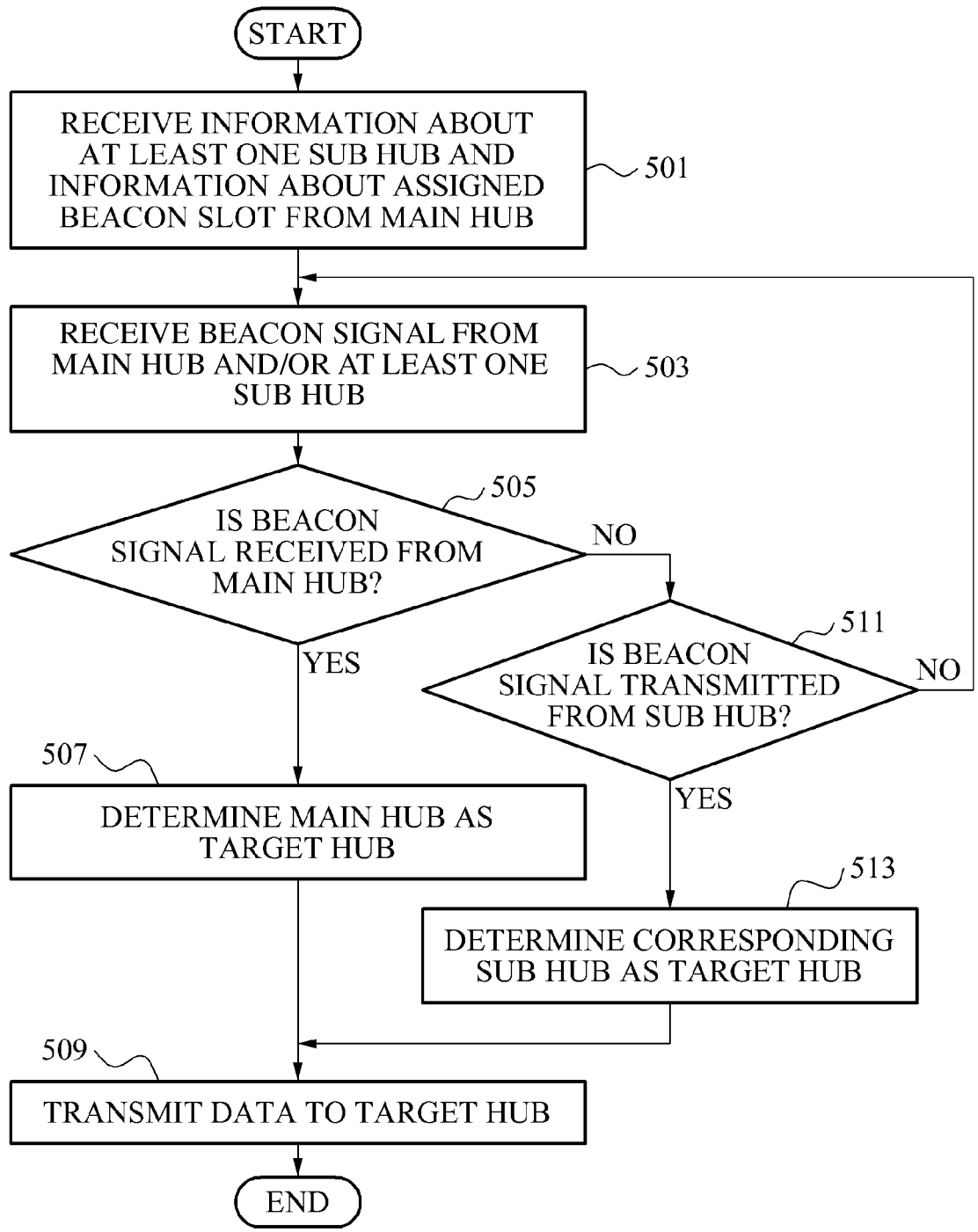
FIG. 5 is a flowchart illustrating an example of a communication method of a sensor node in a WBAN.

FIG. 5 illustrates an example of a communication method of a sensor node in a WBAN. Hereinafter, the communication method of the sensor node in the WBAN including a main hub, at least one sub hub, and at least one sensor node will be described with reference to FIG. 5.

In operation 501, the sensor node receives, from the main hub, information about the sub hub connected with the main hub, and information about an assigned beacon slot of each of the main hub and the sub hub. The information about the sub hub may include, for example, an ID of the sub hub.

In operation 503, the sensor node receives at least one beacon signal from the main hub and/or the sub hub based on the information about the assigned beacon slot. The sensor node determines a target hub, among the main hub and the sub hub, to process data of the sensor node based on the beacon signal from the main hub and/or the sub hub, as described herein. In addition, the sensor node may determine the target hub based on the information about the sub hub connected with the main hub.

In operation 505, the sensor node determines whether the beacon signal is received from the main hub. If the beacon signal is received from the main hub, in operation 507, the sensor node determines the main hub as the target hub. In operation 509, the sensor node transmits the data to the target hub.

On the contrary, if the beacon signal is not received from the main hub, in operation 511, the sensor node determines whether the beacon signal is received from the sub hub. If the beacon signal is received from the sub hub, in operation 513, the sensor node determines the sub hub as the target hub. If the beacon signal is not received from the sub hub, the sensor node returns to operation 503 and thereby receives again at least one beacon signal from the main hub and/or the sub hub.

Figure 6:
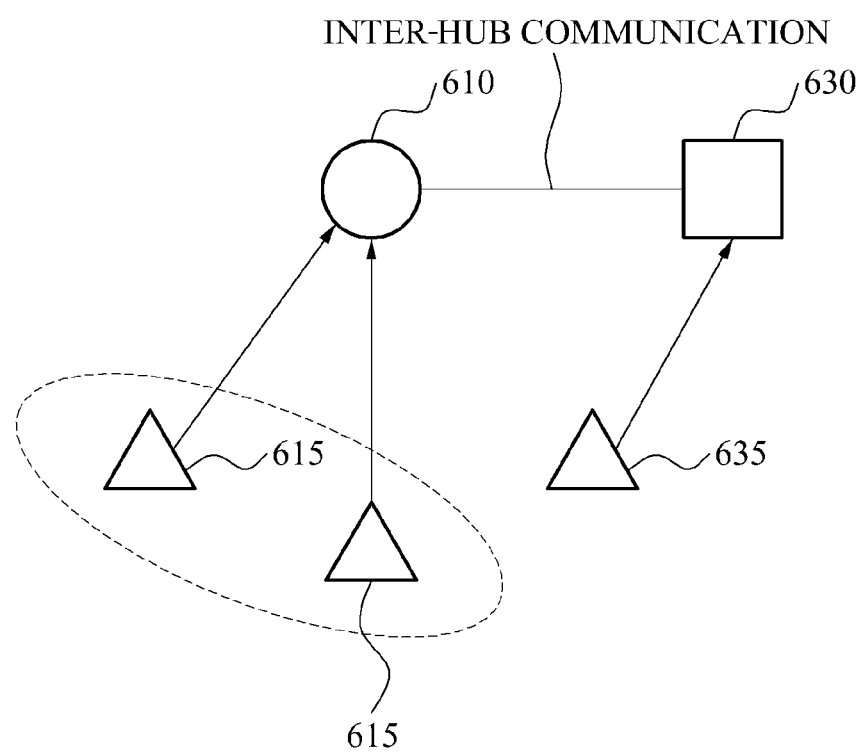
FIG. 6 is a diagram illustrating an example of a sensor node transmitting data to a target hub in a WBAN.

FIG. 6 illustrates an example of a sensor node transmitting data to a target hub in a WBAN. Referring to FIG. 6, each of hubs, for example, a main hub 610 and a sub hub 630 determines whether a hub is present based on a communicability with the hub in the WBAN, and communicable hubs transmit a beacon signal. Each of sensor nodes 615 and 635 receives at least one beacon signal from the main hub 610 and/or the sub hub 630, decodes the beacon signal, and determines a target hub based on the beacon signal. Each of the sensor nodes 615 and 635 transmits data via the target hub. The target hub indicates a hub processing a signal received from a respective one of the sensor nodes 615 and 635.

Each of the sensor nodes 615 and 635 may determine a target hub to transmit the data thereto based on at least one beacon signal received from the main hub 610 and/or the sub hub 630, as expressed in Table 1:

TABLE 1

| Whether a beacon signal is received from a main hub? | Whether a beacon signal is received from a sub hub? | Determine a target hub |
|---|---|---|
| Received | Received | Main hub |
|  | Not received |  |
| Not received | Received | Select from among sub hubs |
|  | Not received | Hub search |

Referring to FIG. 6, for example, the sensor nodes 615 receives a beacon signal from the main hub 610, and determines the main hub 610 as a target hub of the sensor nodes 615. The sensor node 635 does not receive the beacon signal from the main hub 610, receives a beacon signal from the sub hub 630, and determines the sub hub 630 as a target hub of the sensor node 635. Each of the sensor nodes 615 and 635 transmits the data to the main hub 610 and the sub hub 630, respectively. The data transmitted to the sub hub 630 is transferred to the main hub 610 through an inter-hub communication method, such as, for example, operations 311 through 317 of FIG. 3.

Figure 7:
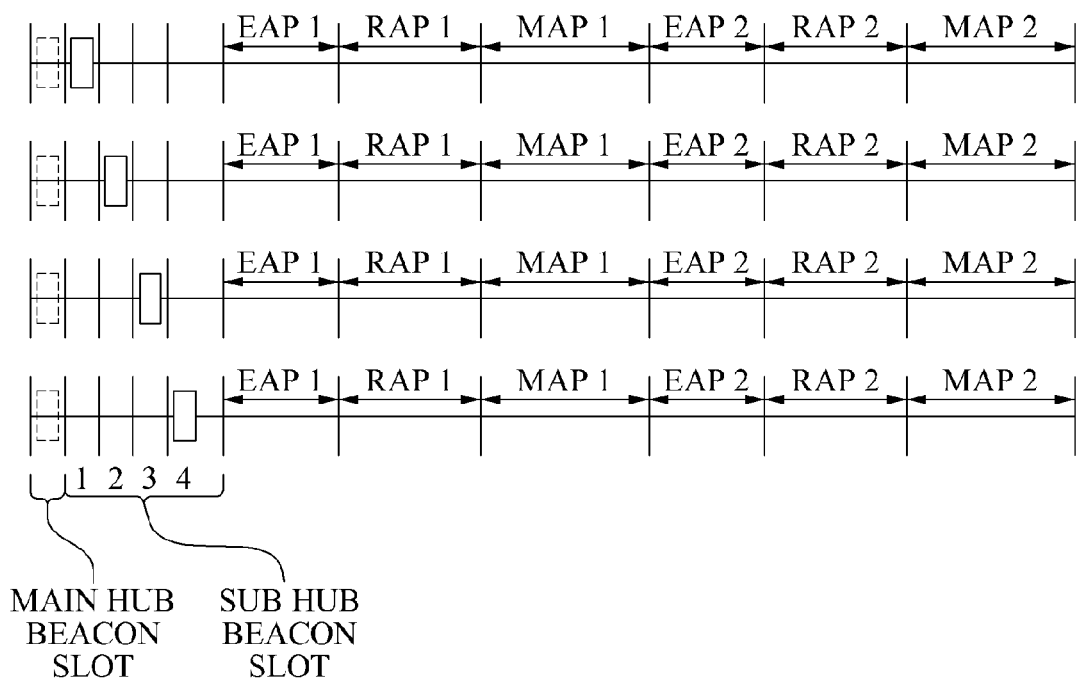
FIG. 7 is a diagram illustrating an example of a main hub assigning a beacon slot in a WBAN.

FIG. 7 illustrates an example of a main hub assigning a beacon slot in a WBAN. As shown in FIG. 7, the main hub assigns a beacon slot to the main hub and to each sub hub so that each sensor node may identify a beacon signal from a respective hub, for example, the main hub and a sub hub. Accordingly, each sensor node may identify a beacon signal based on an identifiable beacon slot, and determines a target hub based on the identifiable beacon signal. Each beacon slot is associated with a beacon period including three periods: an exclusive access phase (EAP) period, a random access phase (RAP) period, and a managed access phase (MAP) period.

EAP (exclusive access phase): A time span set aside by a hub in a beacon period (superframe) for transfer of the traffic of the highest user priority (UP) (for emergency or medical implant event report).

RAP (random access phase): A time span set aside by a hub and announced via a beacon frame for random access to the medium by the nodes in the body area network (BAN) of the hub.

MAP (managed access phase): A time span set aside by a hub for improvised access, scheduled access, and unscheduled access to the medium by the hub and the nodes in the body area network (BAN) of the hub.

Figure 8:
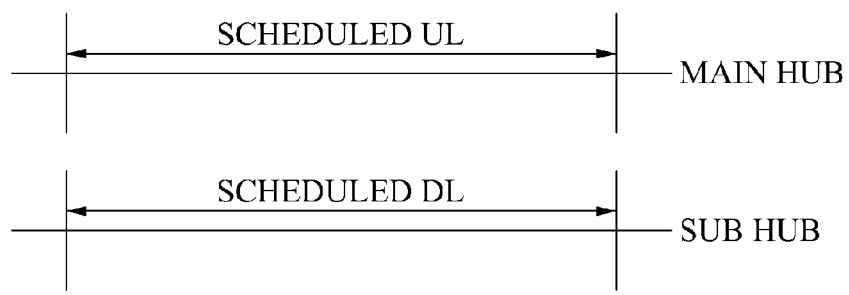
FIG. 8 is a diagram illustrating an example of a Multiple Access Protocol (MAP) period set for a sub hub to transmit stored data to a main hub in a WBAN.

FIG. 8 illustrates an example of an MAP period set for a sub hub to transmit stored data to a main hub in a WBAN. The main hub decodes a beacon signal transmitted from the sub hub to verify whether there is data to be transmitted from the sub hub to the main hub. The main hub assigns a scheduled uplink (UL) period to the MAP period of a beacon period. The main hub transmits information about the uplink period to the sub hub using a beacon signal of the main hub, and thereby informs the sub hub that the uplink period is assigned. The sub hub assigns a scheduled downlink (DL) period to the MAP period based on the information about the uplink period, and transmits the data to the main hub.

Figure 9:
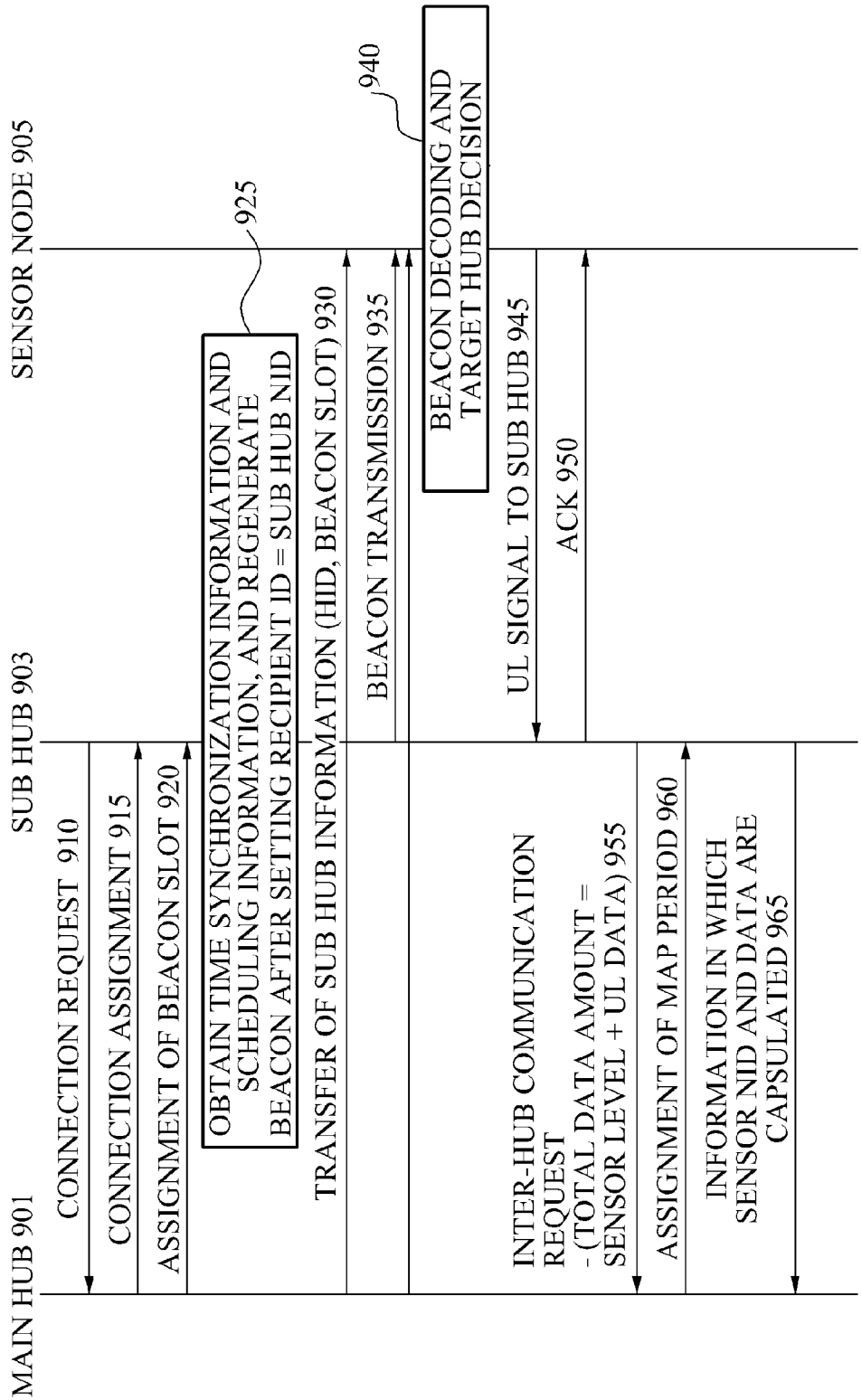
FIG. 9 is a diagram illustrating an example of an initial connection method between a sub hub and a main hub, and a method of simultaneously operating the main hub and the sub hub, in a WBAN.

FIG. 9 illustrates an example of an initial connection method between a main hub 901 and a sub hub 903, and a method of simultaneously operating the main hub 901 and the sub hub 903, in a WBAN. Referring to FIG. 9, the WBAN includes the main hub 901, the sub hub 903, and a sensor node 905.

In operation 910, the sub hub 903 transmits a connection request message to the main hub 901. In operation 915, the main hub 901 performs the initial connection method by transmitting a connection assignment message to the sub hub 903 in response to the connection request message. During the initial connection method, the sub hub 903 sets a sender ID of a beacon signal to be transmitted by the sub hub 903.

In operation 920, the main hub 901 assigns a beacon slot to each of the main hub 901 and the sub hub 903 to prevent beacon signals of the main hub 901 and the sub hub 903 from colliding with each other. Accordingly, the main hub 901 sets a recipient ID of its beacon signal to a network identifier (NID) of the sub hub 903. The main hub 901 may transmit, to the sub hub 903, an assignment signal of the beacon slot, and the sub hub 903 may set time synchronization of the beacon slot based on the assignment signal.

In operation 925, while operating in the WBAN, the sub hub 903 obtains time and frequency synchronization information and scheduling information by receiving and decoding the beacon signal from the main hub 901, and regenerates the beacon signal of the sub hub 903 based on the obtained information. After the initial connection method, in operation 930, the main hub 901 addresses that the sub hub 903 is added or connected by transferring, to the sensor node 905, a signal including, for example, information about the sub hub 903, e.g., information about a hub ID (HID) of the sub hub 903 and the assigned beacon slot of each of the main hub 901 and the sub hub 903. The sensor node 905 receives the beacon signal of the sub hub 903 based on the information about the sub hub 903.

In operation 935, each of the main hub 901 and the sub hub 903 transmits the respective beacon signal to the sensor node 905 in the corresponding assigned beacon slot. Sender IDs of the respective beacon signals transmitted from the main hub 901 and the sub hub 903 are set to a HID of the main hub 901 and the HID of the sub hub 903, respectively. The sub hub 903 regenerates its beacon signal to include the same time and frequency synchronization information and the same scheduling information of the beacon signal of the main hub 901, and transmits the regenerated beacon signal to the sensor node 905.

FIG. 9 further shows an example in which the sensor node 905 does not receive the beacon signal of the main hub 901, and receives only the beacon signal of the sub hub 903, where the main hub 901 and the sub hub 903 simultaneously operate in the WBAN. In operation 940, the sensor node 905 performs beacon decoding, and makes a target hub decision. In more detail, the sensor node 905 selects a target hub, e.g., a target sub hub from among sub hubs based on a beacon signal. In this example, the sensor node 905 selects the sub hub 903 as the target hub based on decoding the beacon signal of the sub hub 903. In another example, if the sensor node 905 receives a beacon signal of another sub hub in addition to the beacon signal of the sub hub 903, the sensor node 905 may select the sub hub 903 as the target hub by giving a priority to the beacon signal of the sub hub 903 selected in a previous beacon period. In still another example, if the beacon signal of the sub hub 903 is not received, the sensor node 905 may select, as the target hub, another sub hub of which a strength of a beacon signal is largest.

In operation 945, the sensor node 905 transmits an uplink (UL) signal including data to the sub hub 903 selected as the target hub. A recipient ID of the UL signal may be set to an NID or an HID of the sub hub 903.

In operation 950, in response to the uplink signal transmitted from the sensor node 905, the sub hub 903 directly transmits an ACK signal to the sensor node 905 based on the sender ID of the beacon signal transmitted from the sub hub 903. The ACK signal informs the sensor node 905 that the data in the UL signal is received.

In operation 955, after termination of a beacon period, the sub hub 903 receiving the data from the sensor node 905 transmits an inter-hub communication request signal to the main hub 901, and thereby informs the main hub 901 that there is data to be transmitted to the main hub 901. The inter-hub communication request signal includes information about the sensor node 905, for example, an NID of the sensor node 905 and/or a total amount of data received from the sensor node 905. The total amount of data may include, for example, a sensor level of the sensor node 905 and/or an amount of uplink data from the sensor node 905.

In operation 960, the main hub 901 informs the sub hub 903 about an assignment of a MAP period, as described with reference to FIG. 8. In operation 965, the sub hub 903 transmits, to the main hub 901, information in which the NID of the sensor node 905 and the data of the sensor node 905 are capsulated based on the MAP period assignment and the uplink signal transmitted from the sensor node 905.

Figure 10:
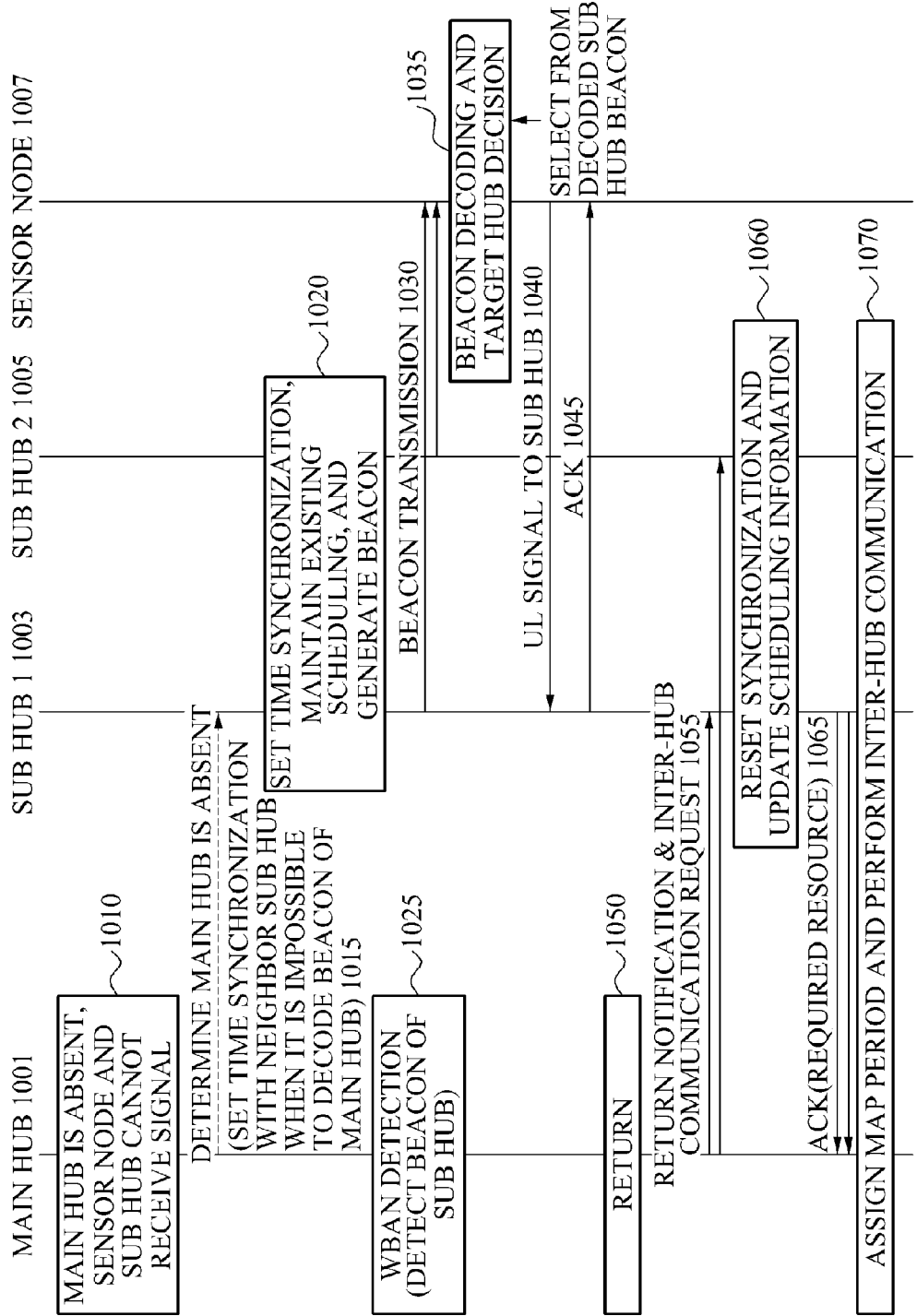
FIG. 10 is a diagram illustrating an example of an operation method of a sub hub when a main hub is absent, and a WBAN operation method using the sub hub when the main hub returns, in a WBAN.

FIG. 10 illustrates an example of an operation method of a sub hub when a main hub is absent, and a WBAN operation method using the sub hub when the main hub returns, in a WBAN. Referring to FIG. 10, the WBAN includes a main hub 1001, a sub hub (1) 1003, a sub hub (2) 1005, and a sensor node 1007. Hereinafter, it is assumed that the sensor node 1007 selects the sub hub (1) 1003 as a target hub.

In operation 1010, the main hub 1001 is absent from the WBAN. Accordingly, the sub hub (1) 1003, the sub hub (2) 1005, and the sensor node 1007 cannot receive a beacon signal from the main hub 1001. In operation 1015, the sub hub (1) 1003 and the sub hub (2) 1005 determine that the main hub 1001 is absent.

When it is impossible to decode the beacon signal of the main hub 1001, time synchronization information may not be updated. Therefore, in operation 1020, the sub hub (1) 1003 and the sub hub (2) 1005 (e.g., neighboring sub hubs of the main hub 1001) set the time synchronization information with each other. Through the setting of the time synchronization information, the sub hub (1) 1003 and the sub hub (2) 1005 maintain scheduling (e.g., the entire time synchronization) of the WBAN and a beacon slot of a sub hub. The sub hub (1) 1003 and the sub hub (2) 1005 further generate respective beacon signals.

In operation 1025, the main hub 1001 periodically performs WBAN detection, i.e., searches for the WBAN in which the main hub 1001 belongs. For example, the main hub 100 may detect for the beacon signal(s) of the sub hub (1) 1003 and/or the sub hub (2) 1005.

In operations 1030 through 1045, while the main hub 1001 is absent, the sub hub (1) 1003 operates the WBAN through transmission of the respective beacon signal to the sensor node 1007. A method in which the sub hub (1) 1003 operates the WBAN is the same as the communication method between the sub hub 903 and the sensor node 905 described above with reference to FIG. 9, and thus, further description will be omitted. The sub hub (1) 1003 stores data received from the sensor node 1007 until the main hub 1001 returns.

In operation 1050, when the main hub 101 detects beacon signal of the sub hub (1) 1003 within the WBAN, the main hub 1001 returns to the WBAN, and performs a method of returning to the WBAN. In operation 1055, the main hub 1001 transmits a return notification signal and an inter-hub communication request signal to the sub hub (1) 1003 and the sub hub (2) 1005. The return notification signal may include, for example, time synchronization information of the WBAN and/or scheduling information.

In operation 1060, the sub hub (1) 1003 and the sub hub (2) 1005 reset the time synchronization information, and update the scheduling information, based on the return notification signal. In operation 1065, in response to the inter-hub communication request signal, the sub hub (1) 1003 and the sub hub (2) 1005 transmit an ACK signal to the main hub 1001. When transmitting the ACK signal, the sub hub (1) 1003 and the sub hub (2) 1005 request assignment of a MAP period based on a NID of the sensor node 1007 and a total amount of data received so far in the sub hub (1) 1003 and the sub hub (2) 1005. The sub hub (1) 1003 and the sub hub (2) 1005 requests the assignment of the MAP period in order to transmit, to the main hub 1001, the data received from the sensor node 1007 during the absence of the main hub 1001. In operation 1070, in response to the request of the assignment of the MAP period from the sub hub (1) 1003 and the sub hub (2) 1005, the main hub 1001 assigns the MAP period to the sub hub (1) 1003 and the sub hub (2) 1005, and performs the same inter-hub communication process as in operations 960 and 965 of FIG. 9.

Figure 11:
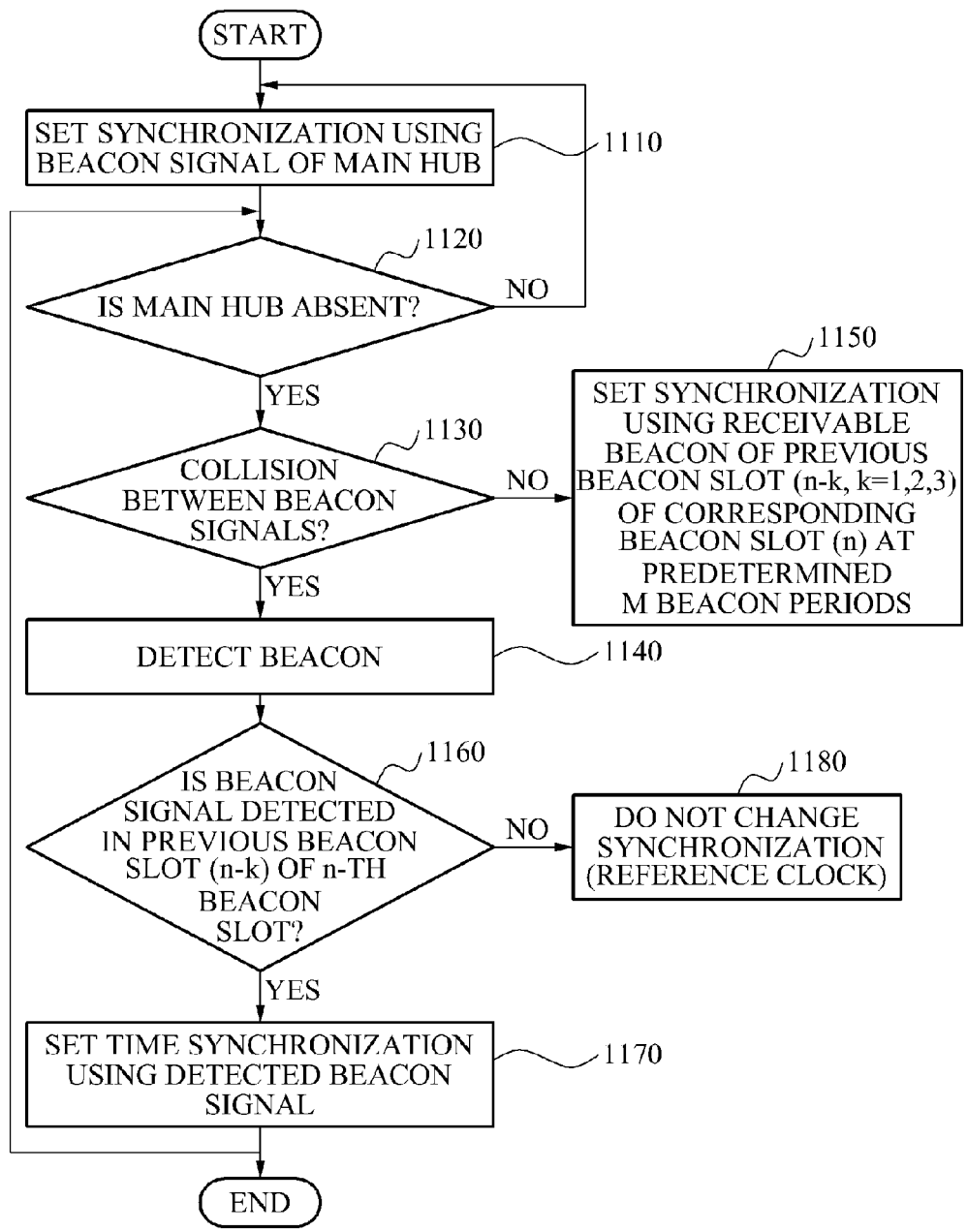
FIG. 11 is a flowchart illustrating an example of a method of setting, by a sub hub, time synchronization in a WBAN.

FIG. 11 illustrates an example of a method of setting, by a sub hub, time synchronization in a WBAN. In operation 1110, the sub hub obtains time synchronization information based on a beacon signal of a main hub, and sets the time synchronization of the sub hub based on the time synchronization information.

In operation 1120, the sub hub determines whether the main hub is absent. If the main hub is absent, in operation 1130, the sub hub determines whether collision has occurred between beacon signals of the sub hub and at least one neighboring sub hub, respectively. If the main hub is not absent, the sub hub returns to operation 1110.

If the collision has occurred, in operation 1140, the sub hub detects the beacon signal of the neighboring sub hub that has been collided with. On the contrary, if the collision has not occurred, in operation 1150, the sub hub sets the time synchronization with another neighboring sub hub based on a receivable beacon signal of the other neighboring sub hub at predetermined beacon periods M. That is, the sub hub obtains time synchronization information based on the receivable beacon signal to set the time synchronization. The sub hub receives the receivable beacon signal including a beacon slot number (n-k, e.g., where n=1, 2, or 3) smaller than a beacon slot number n of the sub hub among neighboring sub hubs.

In operation 1160, the sub hub determines whether the beacon signal of the neighboring sub hub that has been collided with is detected in a previous beacon slot, for example, an (n-k)-th beacon slot of a current beacon slot, for example, an n-th beacon slot, of the sub hub. If the previous beacon slot is detected, in operation 1170, the sub hub sets or resets the time synchronization with the neighboring sub hub based on the beacon signal of the neighboring sub hub. If the previous beacon slot is not detected, or if the sub hub is assigned with a first beacon slot, in operation 1180, the sub hub maintains the time synchronization of the sub hub as a reference clock, i.e., does not change the time synchronization.

Figure 12:
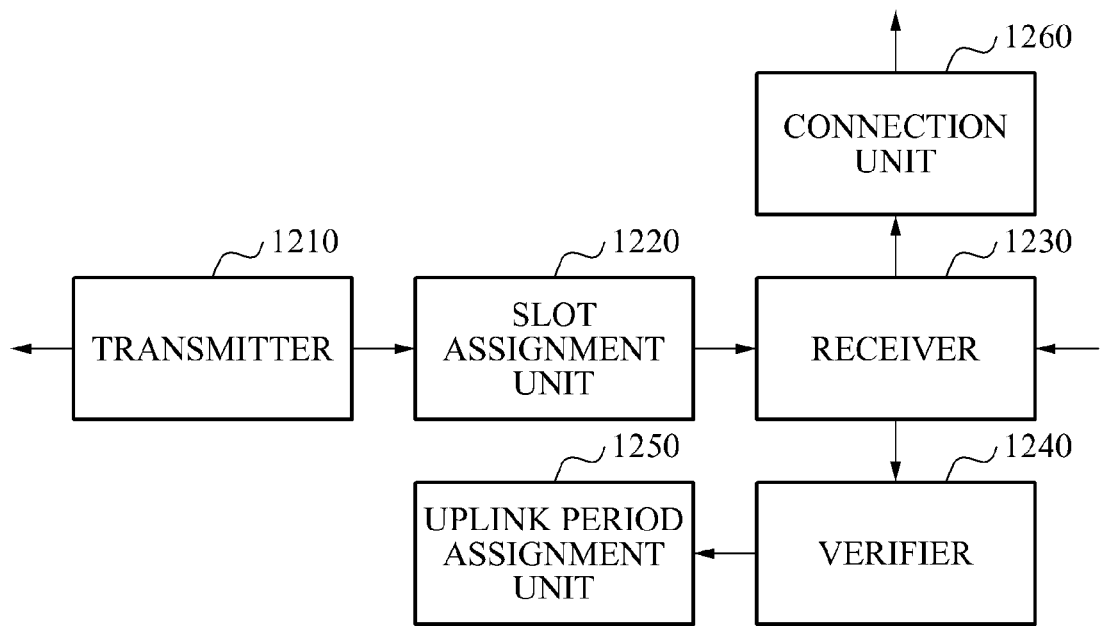
FIG. 12 is a block diagram illustrating an example of a main hub in a WBAN.

FIG. 12 illustrates an example of a main hub 1200 in a WBAN. The WBAN includes the main hub 1200, at least one sub hub, and at least one sensor node. Referring to FIG. 12, the main hub 1200 includes a transmitter 1210, a slot assignment unit 1220, a receiver 1230, a verifier 1240, an uplink period assignment unit 1250, and a connection unit 1260.

The transmitter 1210 transmits, to the sensor node, information about the sub hub connected to the main hub. The transmitter 1210 transmits a beacon signal to sub hub and the sensor node based on a beacon slot.

The slot assignment unit 1220 assigns the beacon slot to each of the main hub 1200 and the sub hub. The receiver 1230 receives a beacon signal based on the beacon slot, from a sub hub determined as a target hub, among sub hubs in the WBAN, by the sensor node. The receiver 1230 further receives, from the sub hub, a request for connection between the sub hub and the main hub 1200, and receives, from the sub hub, data of the sensor node.

The verifier 1240 verifies whether the target hub includes the data to be transmitted to the main hub, using the beacon signal from the target hub. The uplink assignment unit 1250 assigns an uplink period for data transmission to the target hub based on a result of the verification. The connection unit 1260 connects the sub hub and the main hub 1200 in response to the request of the sub hub.

Figure 13:
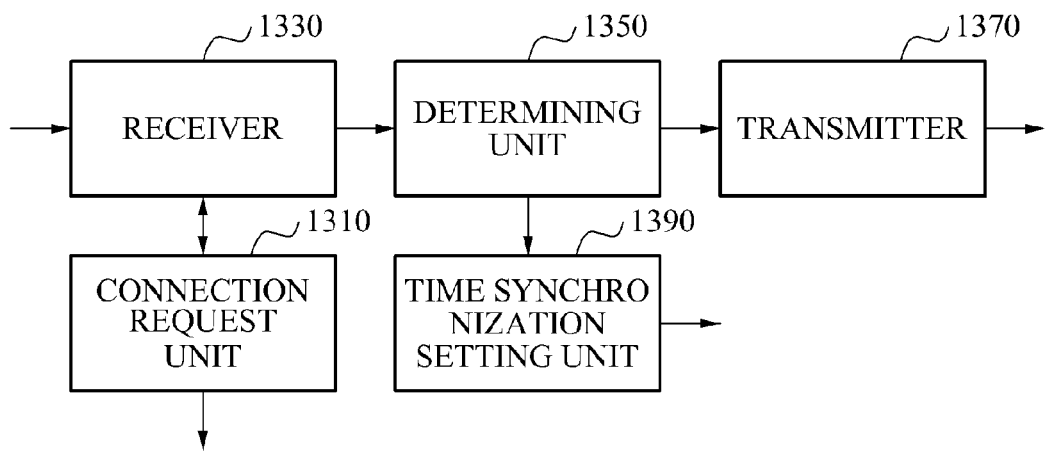
FIG. 13 is a block diagram illustrating an example of a sub hub in a WBAN.

FIG. 13 illustrates an example of a sub hub 1300 in a WBAN. The WBAN includes a main hub, at least one sub hub (e.g., the sub hub 1300), and at least one sensor node. Referring to FIG. 13, the sub hub 1300 includes a connection request unit 1310, a receiver 1330, a determining unit 1350, and a transmitter 1370.

The connection request unit 1310 requests the main hub for connection between the main hub and the sub hub 1300. The receiver 1330 receives, from the main hub, information about an assigned beacon slot of each of the main hub and the sub hub 1300 and a beacon signal. The receiver 1330 further receives data from the sensor node.

The determining unit 1350 determines whether the main hub is absent based on whether the beacon signal is received from the main hub, and the information about the assigned beacon slot. The transmitter 1370 transmits, to the main hub, the data received from the sensor node based on a result of the determination.

Even though not illustrated, the sub hub 1300 may further include a time synchronization setting unit. The time synchronization setting unit may set a time synchronization with at least one neighboring sub hub based on a result of the determination. For example, the time synchronization setting unit may set a beacon slot using a receivable beacon signal of the neighboring sub hub at predetermined beacon periods, and may set the time synchronization based on information obtained using the beacon slot.

A time synchronization setting unit 1390 may set time synchronization with at least one another sub hub that neighbors the sub hub, based on the determination result.

The time synchronization setting unit 1390 may set a beacon slot using a receivable beacon signal of the at least one another sub hub that neighbors the sub hub, at predetermined beacon periods, and may set the time synchronization based on synchronization information that is obtained using the beacon slot.

Figure 14:
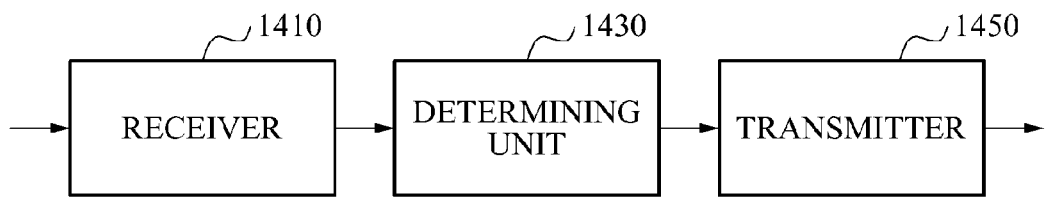
FIG. 14 is a block diagram illustrating an example of a sensor node in a WBAN.

FIG. 14 illustrates an example of a sensor node 1400 in a WBAN. The WBAN includes a main hub, at least one sub hub, and at least one sensor node (e.g., the sensor node 1400). Referring to FIG. 14, the sensor node 1400 includes a receiver 1410, a determining unit 1430, and a transmitter 1450.

The receiver 1410 receives, from the main hub, information about the sub hub connected to the main hub, and information about an assigned beacon slot of each of the main hub and the sub hub. Also, the receiver 1410 receives at least one beacon signal from the main hub and/or the sub hub based on the information about the beacon slot.

The determining unit 1430 determines a target hub, among the main hub and the sub hub, to process data of the sensor node 1400 based on the beacon signal. If the beacon signal is not received from the main hub, the determining unit 1430 determines the target hub based on whether the beacon signal is received from the sub hub. The transmitter 1450 transmits the data to the target hub.

According to the teachings above, there is provided a consecutive operation of a WBAN including at least one sub hub that includes a control function with respect to the WBAN even though a main hub is absent, which enhances a communication reliability of the WBAN. Also, by enabling seamless communication with at least one sensor node of which a LoS is not secured, using the sub hub, information loss and degradation in communication performance are decreased.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a main hub in a wireless body area network (WBAN) comprising the main hub, a sub hub, and a sensor node, the method comprising:
   assigning a beacon slot to the sub hub;
   receiving, from the sub hub that is determined as a target hub by the at least one sensor node from the at least one sub hub, a beacon signal based on the beacon slot;
   verifying whether the sub hub determined as the target hub comprises data to be transmitted to the main hub based on the beacon signal; and
   receiving, from the sub hub, the data based on a result of the verification.

2. The method of claim 1, further comprising:
   receiving, from the sub hub, a request for connection between the sub hub and the main hub;
   connecting the sub hub and the main hub in response to the request; and
   transmitting, to the sensor node, information about the sub hub connected to the main hub.

3. The method of claim 1, further comprising:
   assigning, to the main hub, another beacon slot; and
   transmitting, to the sub hub and the sensor node, another beacon signal based on the other beacon slot.

4. The method of claim 1, further comprising:
   assigning, to the sub hub, an uplink period for data transmission based on the result of the verification.

5. The method of claim 4, further comprising:
   assigning, to the main hub, another beacon slot; and
   transmitting, to the sub hub, information about the uplink period using another beacon signal based on the other beacon slot.

6. The method of claim 1, further comprising:
   recognizing that the sub hub is absent based on a communicability with the sub hub.

7. A non-transitory computer-readable storage medium storing a program comprising instructions to cause a computer to perform the method of claim 1.

8. A communication method of a sub hub in a wireless body area network (WBAN) comprising a main hub, the sub hub, and a sensor node, the method comprising:
   receiving, from the main hub, information about a beacon slot of the main hub;
   receiving, from the sensor node, data;
   determining whether the main hub is absent based on whether the sub hub receives, from the main hub, a beacon signal based on the beacon slot; and
   transmitting, to the main hub, the data based on a result of the determination,
   wherein the sub hub obtains information about time and frequency synchronization and scheduling information by decoding the beacon signal from the main hub, and regenerates a beacon signal of the sub hub based on the obtained information.

9. The method of claim 8, further comprising:
   requesting the main hub for connection between the main hub and the sub hub.

10. The method of claim 9, wherein the requesting of the main hub comprises:
    setting a sender identifier (ID) of another beacon signal that is transmitted from the sub hub.

11. The method of claim 10, further comprising:
    transmitting, to the sensor node, an acknowledgement (ACK) signal based on the sender ID.

12. The method of claim 8, further comprising:
    setting a time synchronization with another sub hub neighboring the sub hub based on a result of the determination.

13. The method of claim 12, wherein the setting of the time synchronization comprises:
    setting another beacon slot based on a receivable beacon signal of the other sub hub at predetermined beacon periods;
    obtaining time synchronization information based on the other beacon slot; and
    setting the time synchronization based on the time synchronization information.

14. The method of claim 8, further comprising:
    receiving, from the main hub, information about an uplink period for data transmission based on the result of the determination; and
    transmitting, to the main hub, the data based on the information about the uplink period.

15. The method of claim 14, further comprising:
    assigning, to the main hub, a downlink period for data transmission based on the information about the uplink period.

16. The method of claim 8, further comprising:
    transmitting, to the main hub, an ACK signal requesting the main hub for assignment, to the sub hub, of a period based on a node ID of the sensor node.

17. A communication method of a sensor node in a wireless body area network (WBAN) comprising a main hub, a sub hub, and the sensor node, the method comprising:
- receiving, from the main hub, information about the sub hub connected to the main hub, and information about beacon slots of the main hub and the sub hub, respectively;
- receiving, from the main hub, or the sub hub, or any combination thereof, a beacon signal based on the information about the beacon slots;
- determining a target hub, among the main hub and the sub hub, to process data of the sensor node based on the beacon signal; and
- transmitting, to the target hub, the data,
- wherein the target hub obtains information about time and frequency synchronization and scheduling information by decoding the beacon signal from the main hub, and regenerates a beacon signal of the sub hub based on the obtained information.

18. The method of claim 17, wherein the determining of the target hub comprises:
- determining the main hub as the target hub if the beacon signal is received from the main hub.

19. The method of claim 17, wherein the determining of the target hub comprises:
- determining the sub hub as the target hub in response to the beacon signal being not received from the main hub and being received from the sub hub.

20. A main hub in a wireless body area network (WBAN) comprising the main hub, a sub hub, and a sensor node, the main hub comprising:
- a slot assignment unit configured to assign, to the sub hub, a beacon slot;
- a receiver configured to receive, from the sub hub that is determined as a target hub by the at least one sensor node from the at least one sub hub, a beacon signal based on the beacon slot; and
- a verifier configured to verify whether the sub hub determined as the target hub comprises data to be transmitted to the main hub based on the beacon signal,
- wherein the receiver is further configured to receive, from the sub hub, the data based on a result of the verification.

21. The main hub of claim 20, wherein:
- the receiver is further configured to receive, from the sub hub, a request for connection between the sub hub and the main hub; and
- the main hub further comprises
  - a connection unit configured to connect the sub hub and the main hub in response to the request, and
  - a transmitter configured to transmit, to the sensor node, information about the sub hub connected to the main hub.

22. The main hub of claim 20, further comprising:
- an uplink assignment unit configured to assign, to the sub hub, an uplink period for data transmission based on the result of the verification.

23. A sub hub in a wireless body area network (WBAN) comprising a main hub, the sub hub, and a sensor node, the sub hub comprising:
- a receiver configured to
  - receive, from the main hub, information about a beacon slot of the main hub, and
  - receive, from the sensor node, data;
- a determining unit configured to determine whether the main hub is absent based on whether the sub hub receives, from the main hub, a beacon signal based on the beacon slot; and
- a transmitter configured to transmit, to the main hub, the data based on a result of the determination,
- wherein the sub hub obtains information about time and frequency synchronization and scheduling information by decoding the beacon signal from the main hub, and regenerates a beacon signal of the sub hub based on the obtained information.

24. The sub hub of claim 23, further comprising:
- a connection request unit configured to request the main hub for connection between the main hub and the sub hub.

25. The sub hub of claim 23, wherein the sub hub comprises a control function with respect to the WBAN.

26. A sensor node in a wireless body area network (WBAN) comprising a main hub, a sub hub, and the sensor node, the sensor node comprising:
- a receiver configured to
  - receive, from the main hub, information about the sub hub connected to the main hub, and information about beacon slots of the main hub and the sub hub, respectively, and
  - receive, from the main hub, or the sub hub, or any combination thereof, a beacon signal based on the information about the beacon slots;
- a determining unit configured to determine a target hub, among the main hub and the sub hub, to process data of the sensor based on the beacon signal; and
- a transmitter configured to transmit, to the target hub, the data,
- wherein the sub hub obtains information about time and frequency synchronization and scheduling information by decoding the beacon signal from the main hub, and regenerates a beacon signal of the sub hub based on the obtained information.

27. The sensor node of claim 26, wherein the determining unit is further configured to:
- determine the main hub as the target hub if the beacon signal is received from the main hub; and
- determine the sub hub as the target hub in response to the beacon signal being not received from the main hub and being received from the sub hub.

28. The method of claim 1, further comprising:
- determining a target hub, among the main hub and the sub hub, to process data of the sensor node based on the beacon signal; and
- transmitting, to the target hub, the data and the information about the uplink period based on a result of the determination of a target hub.

* * * * *